(12) United States Patent
Yuyama

(10) Patent No.: US 7,835,636 B2
(45) Date of Patent: Nov. 16, 2010

(54) CAMERA APPARATUS HAVING AUTO FOCUS FUNCTION

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 233 days.

(21) Appl. No.: 12/141,154

(22) Filed: Jun. 18, 2008

(65) Prior Publication Data

US 2008/0317453 A1    Dec. 25, 2008

(30) Foreign Application Priority Data

Jun. 22, 2007    (JP)    ............... 2007-164566

(51) Int. Cl.
   *G03B 17/00*    (2006.01)
(52) U.S. Cl. ............... 396/55; 348/208.6; 348/352
(58) Field of Classification Search ............ 396/52–55, 396/104, 124; 348/208.4, 208.6, 345, 352
   See application file for complete search history.

(56) References Cited

U.S. PATENT DOCUMENTS

| | | | |
|---|---|---|---|
| 5,999,746 A | 12/1999 | Kitagawa | |
| 2006/0066744 A1* | 3/2006 | Stavely et al. | 348/352 |
| 2008/0044170 A1* | 2/2008 | Yap et al. | 396/52 |
| 2008/0151096 A1* | 6/2008 | Okada | 348/345 |
| 2008/0292148 A1* | 11/2008 | Maruyama et al. | 382/118 |

FOREIGN PATENT DOCUMENTS

| | | |
|---|---|---|
| JP | 10-312006 A | 11/1998 |
| JP | 11-174314 A | 7/1999 |
| JP | 2000-009988 A | 1/2000 |
| JP | 2001-281530 A | 10/2001 |
| JP | 2006-094200 A | 4/2006 |
| JP | 2007-147803 A | 6/2006 |

OTHER PUBLICATIONS

Korean Office Action dated Mar. 22, 2010 and English translation thereof in counterpart Korean Application No. 10-2008-0057121.
Japanese Office Action dated Mar. 30, 2010 and English translation thereof in counterpart Japanese Application No. 2007-164566.

* cited by examiner

*Primary Examiner*—Melissa J Koval
*Assistant Examiner*—Autumn Parker
(74) *Attorney, Agent, or Firm*—Holtz, Holtz, Goodman & Chick, PC

(57) ABSTRACT

A camera apparatus comprises an auto focus controller configured to control a focus lens to move to a focal position, a moving distance acquiring unit configured to acquire a moving distance of a main body of the camera apparatus after the focus lens is moved to the focal position by the auto focus controller, and a focus correction unit configured to correct a position of the focus lens based on the moving distance acquired by the moving distance acquiring unit.

21 Claims, 8 Drawing Sheets

| SUBJECT DISTANCE | FOCAL POSITION |
|---|---|
| ∞ | Ftable (1) |
| ⋮ | ⋮ |
| 10cm | Ftable (n) |

CAMERA APPARATUS HAVING AUTO FOCUS FUNCTION

CROSS-REFERENCE TO RELATED APPLICATIONS

This application is based upon and claims the benefit of priority from prior Japanese Patent Application No. 2007-164566, filed Jun. 22, 2007, the entire contents of which are incorporated herein by reference.

BACKGROUND OF THE INVENTION

1. Field of the Invention

The present invention relates to a camera apparatus and auto focus control method adaptable to a digital camera having an auto focus function.

2. Description of the Related Art

Conventionally, a technique relating to a camera apparatus having an auto focus function which corrects focus deviation by manual operation after so-called focus lock is performed until a determinant shooting instruction is given.

The focus deviation occurred after the focus is locked can be corrected using the above technique. However, the manual operation cannot immediately correct the focus deviation. Moreover, the manual operation is intrinsically burdensome.

BRIEF SUMMARY OF THE INVENTION

According to an embodiment of the present invention, a camera apparatus comprises:
  a focus lens;
  an auto focus controller configured to control the focus lens to move to a focal position;
  a moving distance acquiring unit configured to acquire a moving distance of a main body of the camera apparatus after the focus lens is moved to the focal position by the auto focus controller; and
  a focus correction unit configured to correct a position of the focus lens based on the moving distance acquired by the moving distance acquiring unit.

According to another embodiment of the present invention, an auto focus control method for use with a camera apparatus comprising a focus lens comprises:
  controlling the focus lens to move to a focal position;
  acquiring a moving distance of a main body of the camera apparatus after the focus lens is moved to the focal position; and
  correcting a position of the focus lens based on the acquired moving distance.

According to another embodiment of the present invention, a computer program product configured to store program instructions for execution on a computer system which is included in a camera apparatus comprising a focus lens, enabling the computer system to perform:
  controlling the focus lens to move to a focal position;
  acquiring a moving distance of a main body of the camera apparatus after the focus lens is moved to the focal position; and
  correcting a position of the focus lens based on the acquired moving distance.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Hereinafter, embodiments of the present invention will be described with reference to the drawings.

First Embodiment

Figure 1:
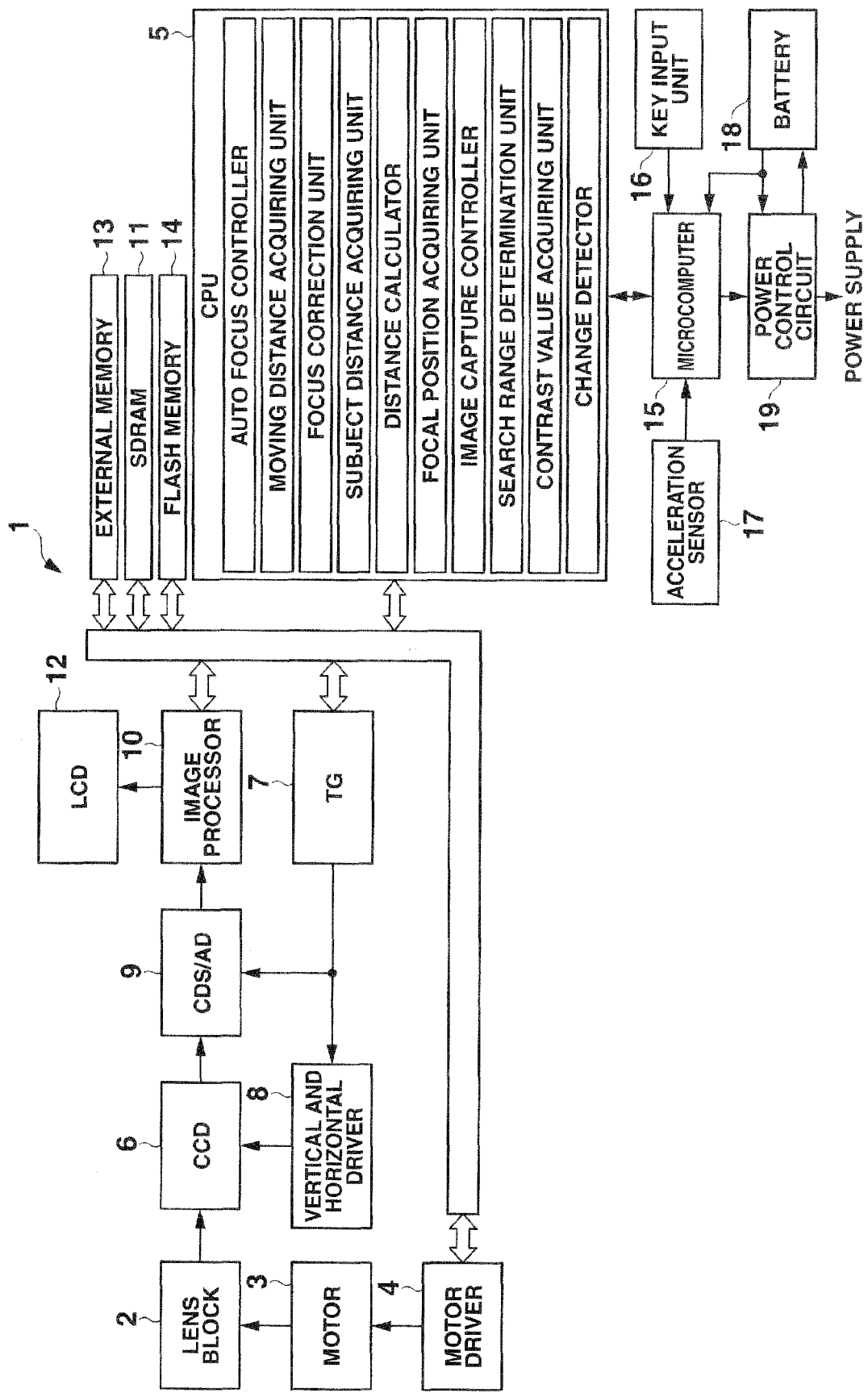
FIG. 1 is a block diagram of a digital camera which is common to embodiments according to the present invention.

FIG. 1 is a block diagram schematically showing an electric configuration of a digital camera 1 which is common to following embodiments. This digital camera 1 has image capture modes including a still image capture mode and a moving image capture mode. The digital camera 11 includes mainly the following illustrated components which will be described below.

The digital camera 1 includes a lens block 2, a motor block 3 and a motor driver 4. The lens block 2 is provided with an optical system including a focus lens. The motor block 3 includes a focus motor which moves the optical system. The motor driver 4 drives the focus motor under the control of a central processing unit (CPU) 5, which controls whole operation of the digital camera 1. A position of the focus lens is changed as the optical system is moved along an optical axis under the control of the CPU 5.

The digital camera 1 includes a charge coupled device (CCD) 6 (image capture unit) which converts an optical image of a subject formed through the lens block 2 into an electrical signal (image signal). A vertical and horizontal driver 8 drives the CCD 6 based on a timing signal generated by a timing generator (TG) 7 under the control of the CPU 5, and the CCD 6 outputs an analog image signal corresponding to the optical image of the subject. A correlated-double-sampling and analog-to-digital-conversion (CDS/AD) circuit 9 performs noise reduction using correlated double sampling and analog-to-digital conversion on the output signal from the CCD 6. Afterward, the converted signal is output to an image processor 10.

The image processor 10 performs RGB interpolation processing, YUV conversion processing, digital signal processing and the like using a synchronous dynamic random access memory (SDRAM) 11 as a working memory under the control of the CPU 5. The RGB interpolation processing generates color component data of red (R), green (G) and blue (B) (hereinafter, referred to as RGB data) for each pixel based on the input digital image signal (Bayer data). The YUV conversion processing generates YUV data including a luminance signal (Y) and color-difference signals (U, V) for each pixel from the RGB data. The digital signal processing includes processing to improve image quality, such as auto white balance and edge enhancement.

The YUV data converted by the image processor 10 are sequentially stored in the SCRAM 11. Every time a frame of data is stored, the frame of data is converted into a video signal and sent to a liquid crystal display (LCD) monitor 12 to be displayed as a through image.

In the still image capture mode, when an instruction to shoot an image is given by shutter button operation (pressing fully the shutter button, in the present embodiment), image data stored temporarily in the SDRAM 11 is compressed by the CPU 5, and eventually recorded as a still image file having a predetermined format in an external memory 13. In addition, when capturing a moving image in the moving image capture mode, a plurality of frames of image data stored at a predetermined frame rate in the SDRAM 11 are sequentially compressed by the CPU 5, and finally recorded in the external memory 13 as a moving image file.

The external memory 13 may include various types of memory card. In a reproduction mode, the still image file and the moving image file recorded in the external memory 13 are read and decompressed by the CPU 5 in response to image selection operation given by the user, and then expanded in the SDRAM 11 as YUV data. The LCD 12 reproduces and displays the expanded data.

The digital camera 1 includes a flash memory 14 which is a rewritable nonvolatile memory. In the flash memory 14, stored are various programs to allow the CPU to control the above components, that is, programs for executing auto exposure (AE) control based on luminance information contained in the image signal, auto focus (AF) control and auto white balance (AWB) control. The flash memory 14 also stores various data for use in execution of those control processes. In the above AF control process, used for focusing is known contrast detection in which an AF evaluation value, i.e., a contrast value (quantity of high frequency components) of the subject image resulting from the image signal output from the CCD 6 is acquired while the focus lens is being moved along the optical axis, and then the focus lens is brought to a peak position (focal position) where the AF evaluation value becomes largest.

Figure 2:
FIG. 2 is a conceptual view showing a conversion table of a focus lens position and a distance (FLP-D table)

In the flash memory 14 of the present embodiment, stored are a focus control program and data constituting a conversion table of a focus lens position and a distance to a subject (FLP-D table) 101 shown in FIG. 2. The focus control program allows the CPU 5 to function as an auto focus controller, a moving distance acquiring unit, a focus correction unit, a subject distance acquiring unit, a distance calculator, a focal position acquiring unit and an image capture controller according to the present invention. The FLP-D table 101 is table information including subject distances and corresponding focal positions of the focus lens of the lens block 2. For each position of the focus lens, the FLP-D table 101 provides a corresponding shooting distance to the subject. That is, in the case where the focus lens is located at a certain lens position, the subject can be brought into focus when the subject is situated at the shooting position known by referring to the FLP-D table 101 in accordance with the lens position. The FLP-D table 101 also provides a position of the focus lens which should be set in order to focus on the subject positioned at a certain shooting distance. That is, the flash memory 14 is a table information storage unit.

A microcomputer 15 is connected to the CPU 5. A key input unit 16 and an acceleration sensor 17 are connected to the microcomputer 15. The input unit 16 includes a shutter button, a power key, a mode changeover switch, a zoom up and down button and the like which are not illustrated herein. The microcomputer 15 constantly detects whether or not a key, button or switch in the input unit 16 is operated. When a user operates a key, button or switch, an operation signal corresponding to the operation is sent from the microcomputer 15 to the CPU 5.

The shutter button has a so-called half shutter function, and can be depressed in two stages of half depression and full depression (shooting instruction). The shutter button is also used to start recording (as a movie-start key) in the moving image capture mode, i.e., in capturing a moving image.

Figure 4A:
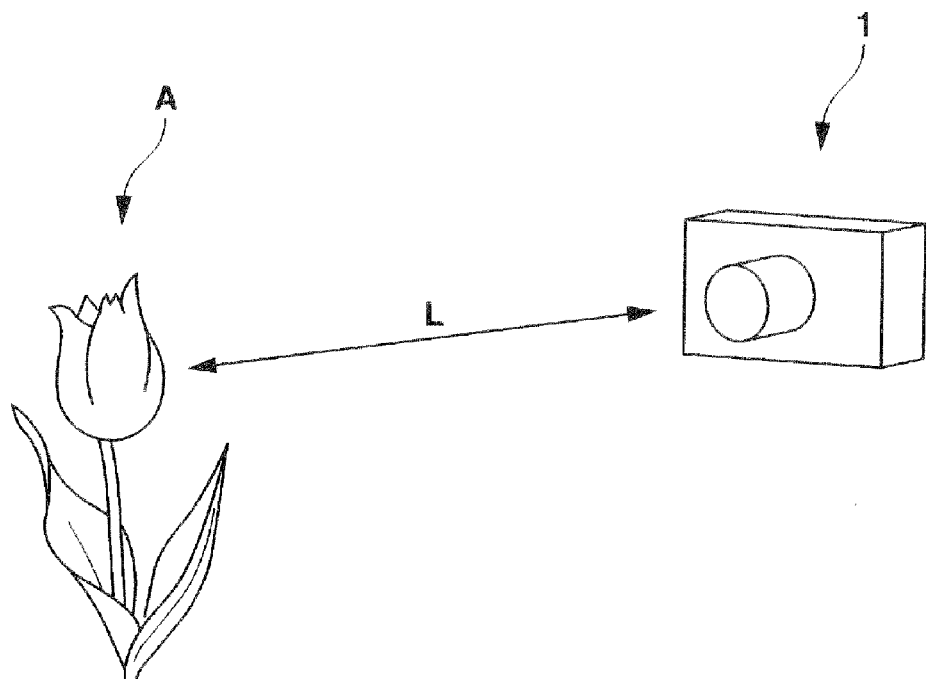
FIGS. 4A and 4B are explanatory views showing positional relation between a subject and a camera.
Figure 4B:
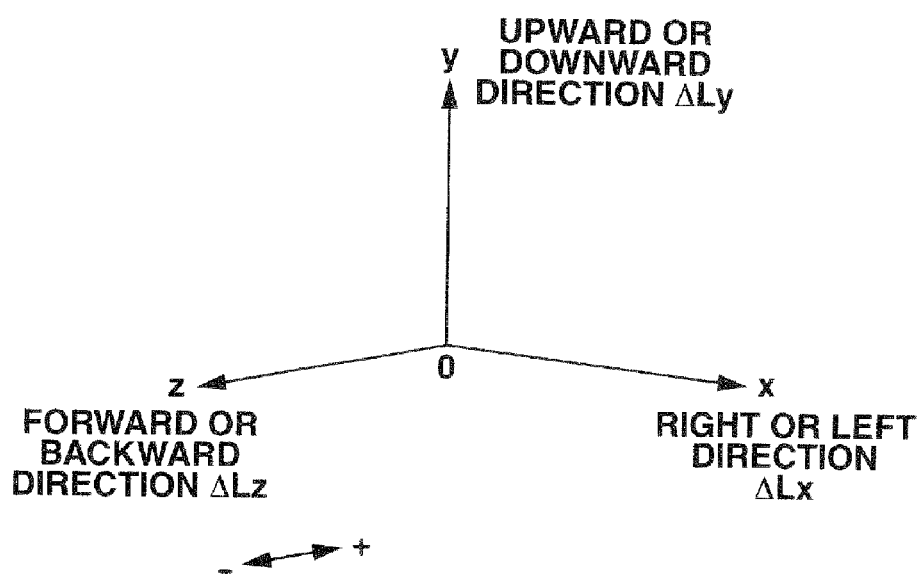

The acceleration sensor 17 is a detector of the present invention which detects acceleration of a main body of the digital camera 1 along respective three axes including x, y and z axes as motion information indicating movement of the main body. A detection signal from the acceleration sensor 17 is sent to the CPU 5 via the microcomputer 15. The acceleration sensor 17 is arranged within the camera main body so that the z-axis of the acceleration sensor 17 matches the optical axis of the lens block 2, the x-axis matches the horizontal axis of the camera main body and the y-axis matches the vertical axis of the camera main body (see FIG. 4B).

The digital camera 1 includes a power control circuit 19 which controls power of a chargeable battery 18 such as a nickel hydrogen battery to apply required voltage to the respective above components. The operation of the power control circuit 19 is controlled by the microcomputer 15.

Figure 3:
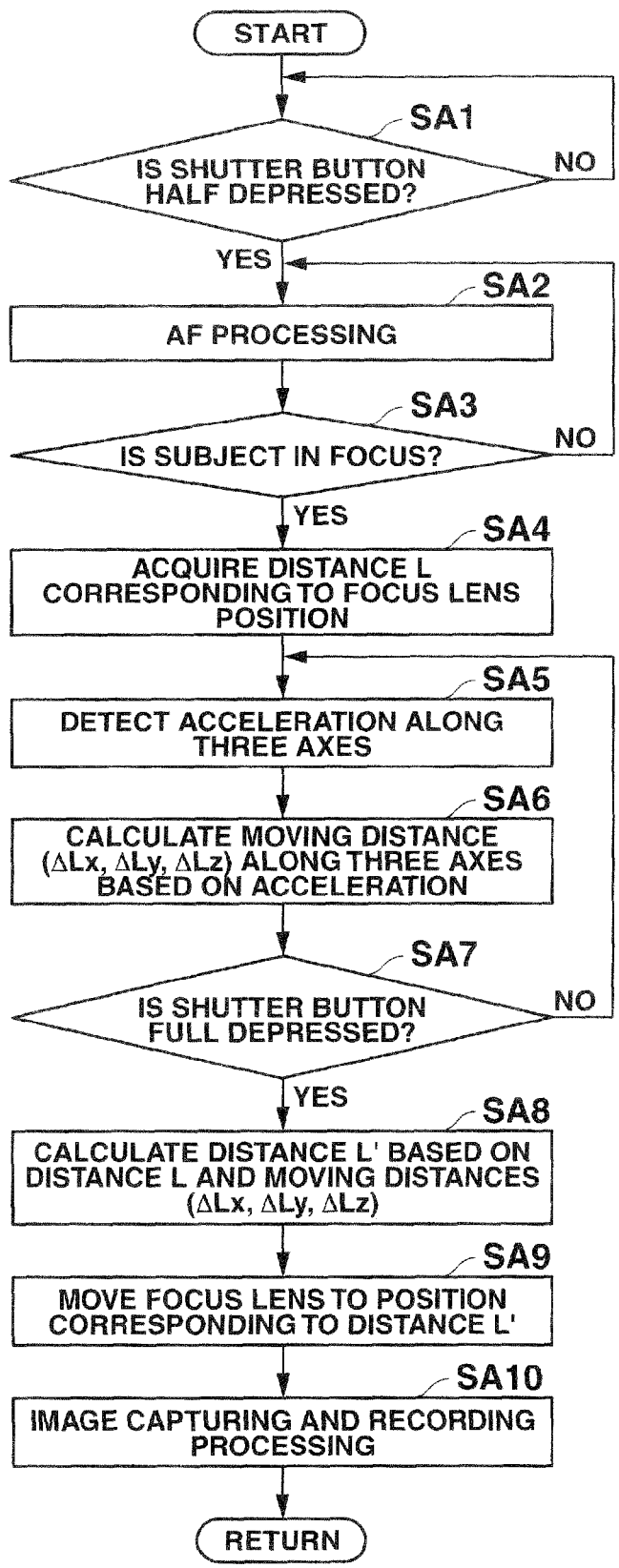
FIG. 3 is a flowchart of operation according to a first embodiment.

Next, operation of the digital camera 1 having the above configuration according to the present invention will be described. FIG. 3 is a flowchart of processing which the CPU 5 executes when the still image capture mode is set.

When the still image capture mode is set in the digital camera 1, the CCD 6 repeatedly captures frames of a subject image at predetermined intervals, and the captured frames of the subject image are sequentially displayed as the through image in the liquid crystal display monitor 12.

During display of the through image, the CPU 5 continuously determines whether or not the shutter button is half depressed (step SA1) as shown in FIG. 3. When the shutter button is half depressed ("YES" in step SA1), common auto focus (AF) processing which uses the above-described contrast detection is started (step SA2), and the AF processing is continued until a main subject A (see FIG. 4A) comes into focus (while determination result of step SA3 remains "NO"). When the subject comes finally in focus ("YES" in step SA3), a subject distance L corresponding to the current position of the focus lens is acquired from the FLP-D table 101 (see FIG. 2) and stored in the working memory (step SA4).

Subsequently, the acceleration sensor 17 detects acceleration of the camera main body along the three (x, y, and z) axes (step SA5), and moving distances ($\Delta Lx$, $\Delta Ly$, $\Delta Lz$) of the camera main body along the axes are calculated based on the detected acceleration (step SA6). Then, the processing of steps SA5 and SA6 is repeated until the shutter button is fully pressed (while determination result of step SA7 remains "NO"). While the processing is being repeated, the position of the focus lens is maintained at the position set under the control of the AF processing in step SA2. That is, focus is locked and the lock is maintained while repeating the processing of steps SA5 and SA6.

The moving distances ($\Delta Lx$, $\Delta Ly$, $\Delta Lz$) calculated in step SA6 represent distances in three directions along the axes between a present position of the camera main body and a lock position at which the camera main body is positioned when focusing with the AF processing is completed (distances the main body has moved in right or left direction, upward or downward direction, and forward or backward direction). When executing the processing of steps SA5 and SA6 for the second time or later, moving distances are calculated in such a manner that currently detected moving distances are added to or subtracted from the previously calculated moving distances. The calculated moving distances (ΔLx, ΔLy, ΔLz) are sequentially stored in the working memory.

Figure 5:
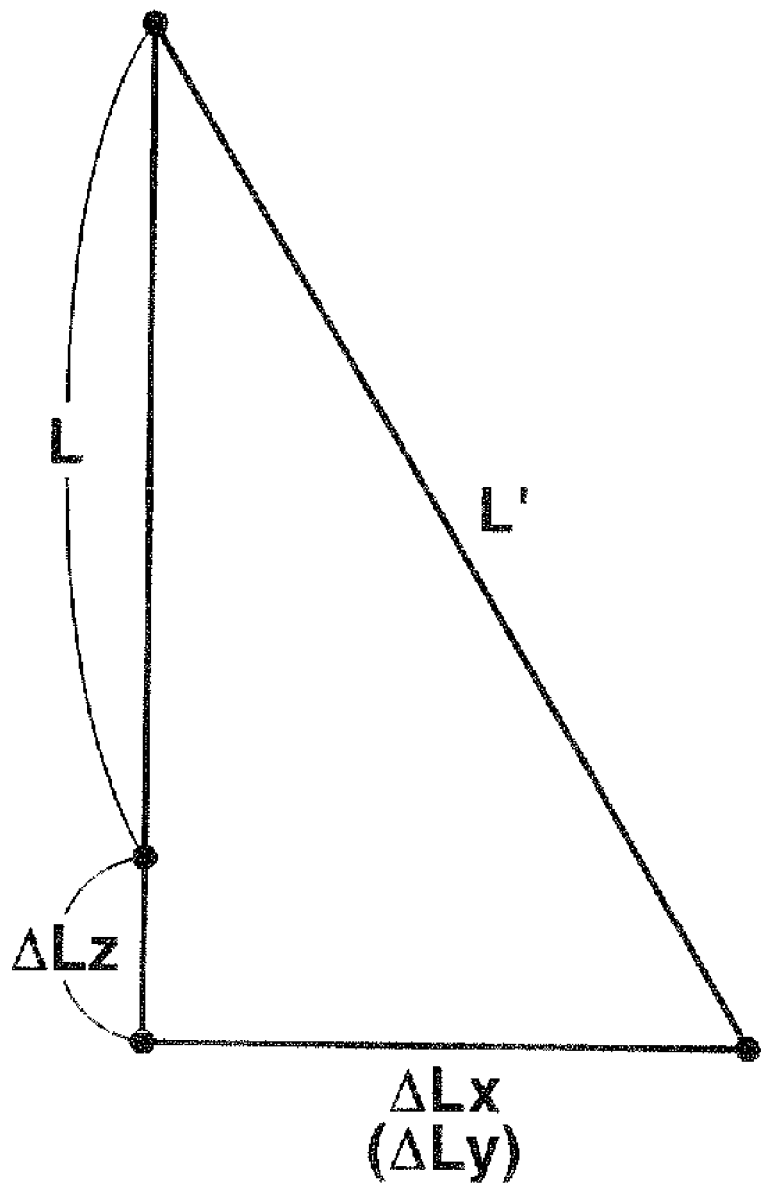
FIG. 5 is an explanatory view showing relation between moving distances along three axes and subject distances of when a shutter button is half pressed and when the shutter button is fully pressed.

Afterward, when the shutter button is fully depressed ("YES" in step SA7), an appropriate subject distance L' is calculated (step SA8 in FIG. 3) based on the subject distance L stored in the working memory and the moving distances (ΔLx, ΔLy, ΔLz) along the x, y, and z axes, i.e., final moving distances from the lock position. The appropriate subject distance L' (see FIG. 5) is expressed by:

$$L'=\sqrt{(L+\Delta Lz)^2+(\Delta Lx)^2+(\Delta Ly)^2}$$

Then, a position of the focus lens corresponding to the calculated appropriate subject distance L' is retrieved from the FLP-D table 101, and the focus lens is moved to the retrieved position (step SA9). That is, focus deviation due to the movement of the camera main body, which occurs after the half depression of the shutter button, is corrected; then an image is shot (image to be recorded is captured) and the captured image is recorded in the external memory 13 (step SA10). Afterward, the flow returns to step SA1 to repeat the above-mentioned processing. Though it is not illustrated herein, in a case where the shutter button is half depressed and then the half-depression is cancelled before full depression, the flow immediately returns to step SA1.

As described above, in the present embodiment, even when a subject is brought out of focus owing to movement of the camera main body while the focus is being locked, an appropriate subject distance L' is calculated in response to full depression of the shutter button based on moving distances of the camera main body along the three axes which have been sequentially detected after the focus is locked, and the position of the focus lens is controlled depending on the calculated appropriate subject distance L'. That is, the focus is automatically corrected.

Furthermore, in this case, unlike the common AF processing which employs the contrast detection and is executed when the shutter button is half depressed, the focus lens is merely moved to a known position (focal position) corresponding to the appropriate subject distance L'. Consequently, the focus correction can be performed at high speed.

Therefore, even when the subject is brought out of focus after the focus is locked, deviation from the focus can immediately be corrected without manual operation.

In the present embodiment, the appropriate subject distance L' is calculated in response to full depression of the shutter button; however, the calculation may be sequentially performed until the shutter button is fully pressed. That is, the processing of step SA8 may be performed immediately after step SA6.

Furthermore, the processing of step SA9 to move the focus lens to the position corresponding to the appropriate subject distance L' may be performed immediately after the subject distance L' is calculated subsequently to the processing of step SA6 (i.e., immediately before the step SA7). That is, in the present embodiment, the position of the focus lens, which is controlled by the AF processing responding to half depression of the shutter button, is collectively corrected when the shutter button is fully pressed; however, the position may be sequentially corrected until the shutter button is fully pressed.

Second Embodiment

Next, a second embodiment of the present invention will be described. In the present embodiment, the flash memory 14 of the digital camera 1 having the configuration of FIG. 1 stores a focus control program which causes the CPU 5, when the still image capture mode is set, to function as an auto focus controller, a moving distance acquiring unit, a focus correction unit, a subject distance acquiring unit, a distance calculator and a search range determination unit according to the present invention and to perform the processing shown in FIG. 6.

Figure 6:
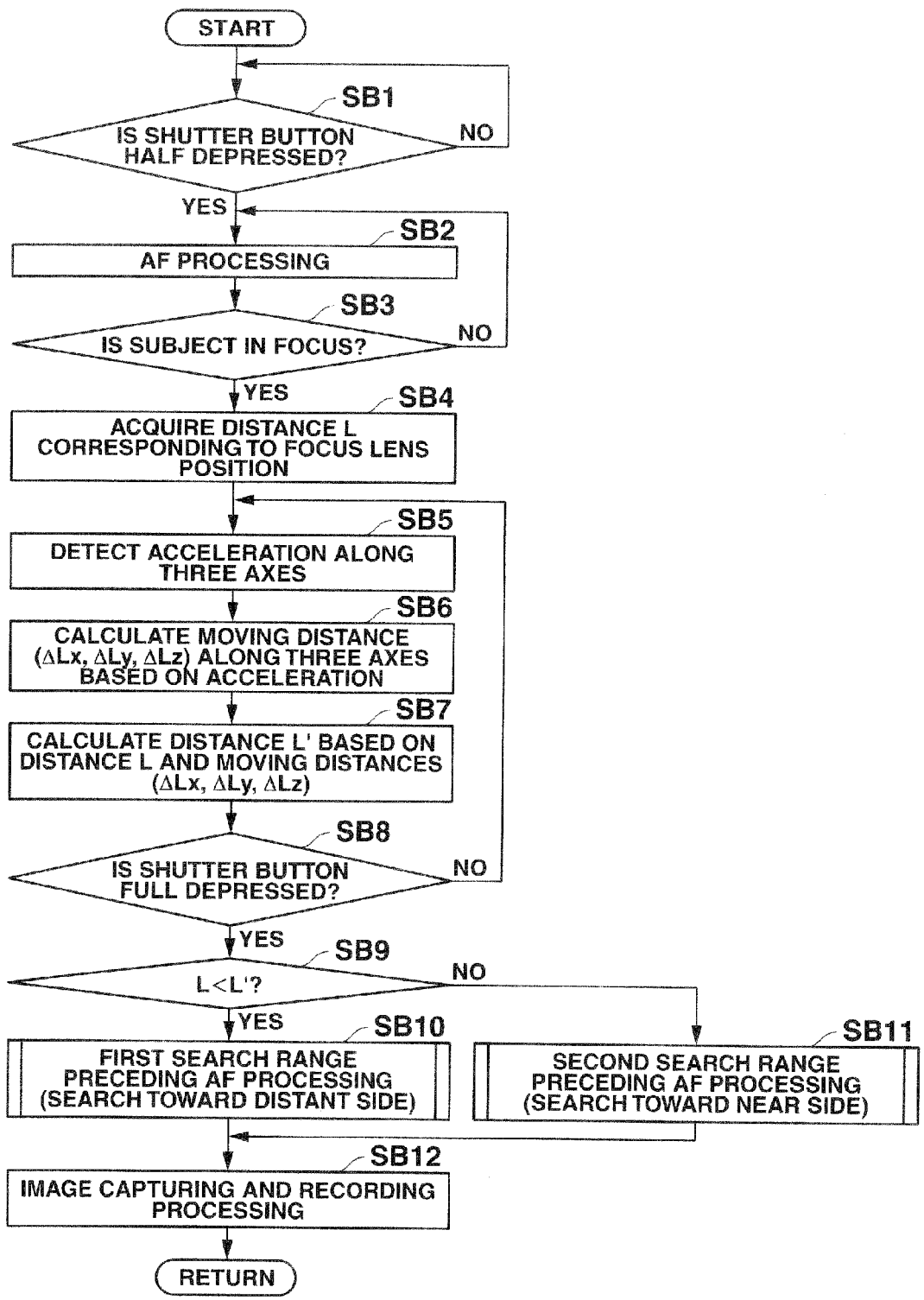
FIG. 6 is a flowchart of operation according to a second embodiment.

Hereinafter the processing of the CPU 5 will be described with reference to FIG. 6. When the still image capture mode is set, the CPU 5 performs the common AF processing using the above-described contrast detection in response to half depression of the shutter button and acquires a current subject distance L based on a position of the focus lens, and then the subject distance L is stored in the working memory (steps SB1 to SB4). Afterward, the acceleration sensor 17 sequentially detects acceleration of the camera main body along the three axes (x, y, and z axes) (step SB5). Moving distances (ΔLx, ΔLy, ΔLz) of the camera main body along the axes are calculated based on the detection result (step SB6). Subsequently, an appropriate subject distance L' is immediately calculated based on the calculated moving distances (ΔLx, ΔLy, ΔLz) and the subject distance L stored in the working memory (step SB7).

The moving distances (ΔLx, ΔLy, ΔLz) calculated in step SB6 represent distances (moving distances in left or right direction, upward or downward direction and forward or backward direction) between a present position of the camera main body and a lock position at which the camera main body is positioned when the AF processing is completed, in the same manner as in the first embodiment. When executing the processing of step SB6 for the second time or later, moving distances are calculated in such a manner that currently detected moving distances are added to or subtracted from the previously calculated moving distances. The calculated moving distances (ΔLx, ΔLy, ΔLz) are sequentially stored in the working memory, similarly to the first embodiment.

Then, the CPU 5 repeats processing of steps SB5 to SB7 and sequentially acquires appropriate subject distances L' until the shutter button is fully pressed (while determination result of step SB8 remains "NO"). While the processing is being repeated, the position of the focus lens is maintained at a position set under the control of the AF processing in the step SB2. That is, focus is locked and the locked state is maintained.

Afterward, when the shutter button is fully depressed ("YES" in step SB8), it is determined whether or not the appropriate subject distance L' calculated in the most recent execution of the processing of step SB7 is larger than the subject distance L stored in the working memory (step SB9). Then, in a case where the determination result of step SB9 is "YES" and it can be determined that the camera main body is moved away from the subject as compared with the time of half-depression of the shutter button, first search range preceding AF processing is performed as described later (step SB10). In a case where the determination result of step SB9 is "NO" and it can be considered that the camera main body has approached to the subject in comparison with the time of half-depression of the shutter button, second search range preceding AF processing is performed as described later (step SB11).

Figure 7:
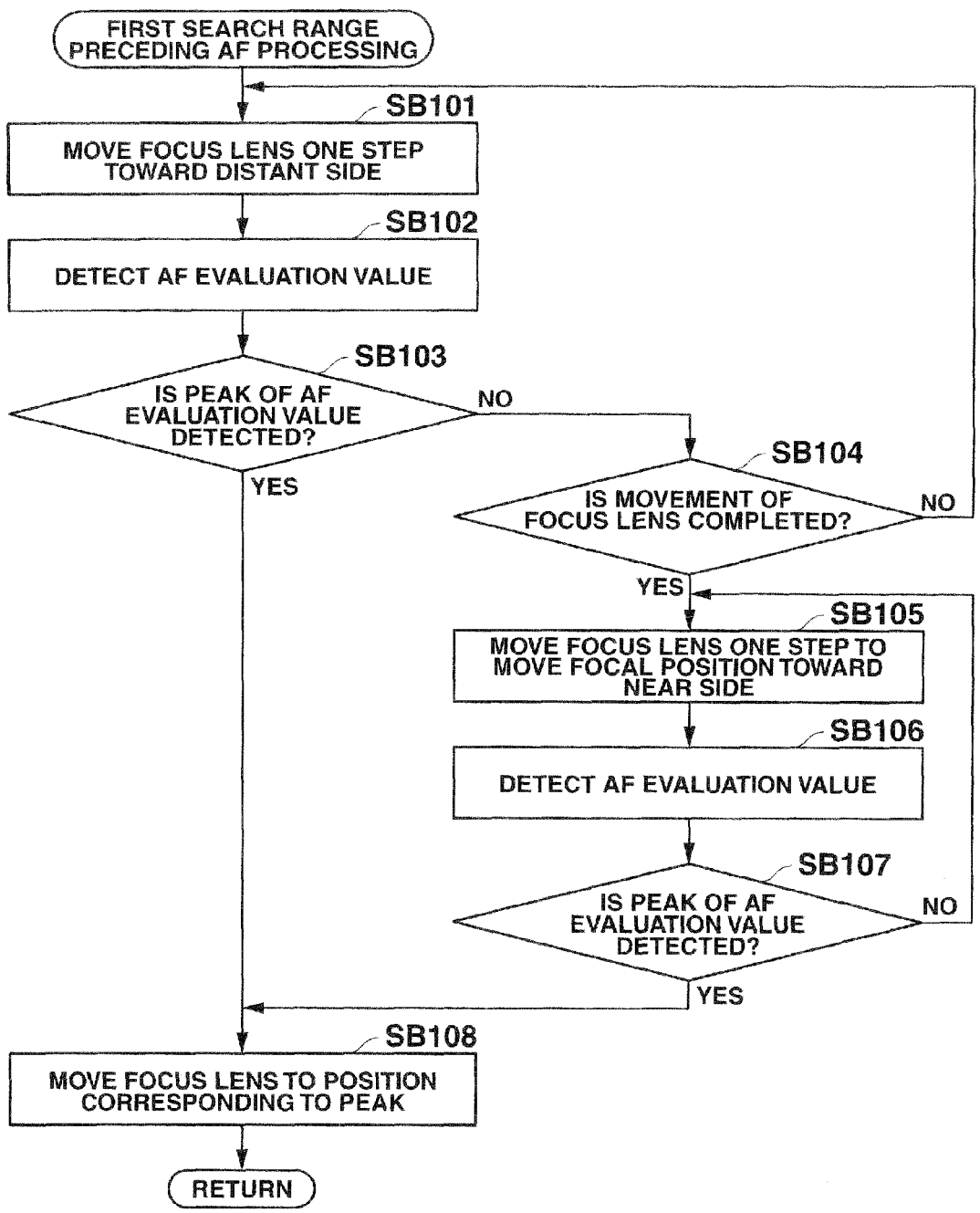
FIG. 7 is a flowchart of contrast AF processing limited to a first search range.

FIG. 7 is a flowchart of the first search range preceding AF processing performed by the CPU 5. The first search range preceding AF processing is auto focus (AF) control processing employing contrast detection in which a search range to be searched firstly is set to a distant (far from the subject) zone, and the distant zone is preferentially searched for a focal position while the focus lens is being moved along the optical axis.

According to the first search range preceding AF processing, the focus lens is moved one step and the focal position is moved toward a distant side in the search range (step SB101). Then an image is captured and an AF evaluation value is detected (step SB102). When a peak position can not be detected, that is, when a turn from increasing to decreasing of the AF evaluation value is not be detected ("NO" in step SB103), and when predetermined steps of movement toward the distant side is not completed in the search range ("NO" in step SB104), the flow returns to step SB101 and movement of the focus lens to the distant side and detection of the AF evaluation value are repeated.

In the above processing, the predetermined number of the AF evaluation values detected by multiple execution of step S102 is stored in the working memory. In step SB103, peak detection is executed based on stored AF evaluation values.

Afterward, while repeating the above processing, when the turn of the AF evaluation value is detected ("YES" in step SB103), the focus lens is moved to a position where the AF evaluation value takes the detected peak (step SB108), and then the AF processing is completed.

On the other hand, in a case where a peak of the AF evaluation values is not detected ("NO" in step SB103) and the predetermined number of steps of movement toward the distant side are completed ("YES" in step SB104) while repeating the processing of the steps SB101 to SB104, e.g., when the focal position reaches a limit position in the distant zone, the focus lens is moved one step to move the focal position toward a near side (step SB105), and then the AF evaluation value is detected (step SB106). When a peak of the AF evaluation value is not be detected ("NO" in step SB107), the flow returns to step SB105 to repeat movement of the focus lens to the near side and detection of the AF evaluation value.

When executing the processing of step SB105 for the first time, the focus lens is moved one step after the focus lens is returned to a position at which the focus lens is positioned when the first search range preceding AF processing is started. In addition, detecting the peak of the AF evaluation value in step SB107 is executed in a similar manner to that of step SB103.

Afterward, when the peak of the AF evaluation value is detected ("YES" in step SB107) from the AF evaluation values, which are acquired in multiple execution of step SB106 while repeating the above processing, the focus lens is moved to a position where the AF evaluation value takes the peak (step SB108), then the AF processing is terminated.

On the other hand, in reverse to the above first search range preceding AF processing, the second search range preceding AF processing is auto focus (AF) processing employing contrast detection in which a search range to be searched firstly is set to a near zone (close to the subject) and the near zone is searched preferentially for a focal position while the focus lens is being moved along the optical axis. Though it is not illustrated, a specific process procedure of the second search range preceding AF processing is such that the focus lens moves in the reverse direction to the processing shown in FIG. 7.

When either first or second search range preceding AF processing is completed, then an image is shot (image to be recorded is captured) and the captured image is recorded in an external memory 13 (step SB12). Thereafter, the flow returns to step SB1 to repeat the above processing. Though it is not illustrated, in a case where the shutter button is half depressed and then the half-depression is cancelled before full depression, the flow immediately returns to step SB1.

As described above, in the present embodiment, even when a subject is brought out of focus owing to movement of the camera main body while the focus is being locked, a position of the focus lens is controlled using the first search range preceding AF processing or the second search range preceding AF processing in response to full depression of the shutter button. That is, the focus is automatically corrected.

The subject distance L is corresponding to a position at which the focus lens is positioned when the focus is locked, and the subject distance L' is continuously calculated on the basis of moving distances along the three axes while the focus is being locked. In the first or second search range preceding AF processing, a range which is to be firstly searched for the focal position is set to the distant or near zone based on the subject distance L and the appropriate subject distance L'. Consequently, the AF processing (focus correction) can be performed at a high speed.

Therefore, even when the subject comes out of focus after the focus is locked, deviation from the focus can immediately be corrected without manual operation.

In the present embodiment, the appropriate subject distance L' is continuously calculated after the focus is locked; however, the appropriate distance may be calculated only when the shutter button is fully pressed in the same manner as in the first embodiment.

In the present embodiment, first or second search range preceding AF processing is executed after the full depression of the shutter button. However, the following processing may be performed. For example, immediately before the step SB9, it may be determined whether or not a difference between the subject distances L and L' is within a given allowance range, i.e., whether or not the subject distance L is substantially equal to the distance L'. In a case where it is determined that the distance L is substantially equal to the distance L', the flow may immediately advance to the image capturing and recording processing of step SB12 without performing the first or second search range preceding AF processing.

The first or second search range preceding AF processing is performed depending on the comparison result of the subject distances L and L' in the present embodiment, namely, the range in which the focus deviation is preferentially searched is set to distant or near zone depending on the comparison result; however, the following processing may be executed. That is, instead of the AF processing depending on the comparison result between the subject distances L and L', AF processing in which a search range for the focus lens is limited to a distant zone or a near zone may be performed. When the appropriate subject distance L' is larger than the subject distance L, the search range of the focus lens may be limited to the distant zone, and when the appropriate subject distance L' is equal to or smaller than the subject distance L, the search range of the focus lens may be limited to the near zone.

Third Embodiment

Next, a third embodiment of the present invention will be described. In the present embodiment, the flash memory 14 of the digital camera 1 having the configuration shown in FIG. 1 stores a focus control program which causes the CPU 5 to function as an auto focus controller, a moving distance acquiring unit, a focus correction unit, a subject distance acquiring unit, a distance calculator, a search range determination unit, a contrast value acquiring unit and a change detector according to the present invention and causes the CPU 5 to perform processing of FIG. 8 when a moving image capture mode is set.

Figure 8:
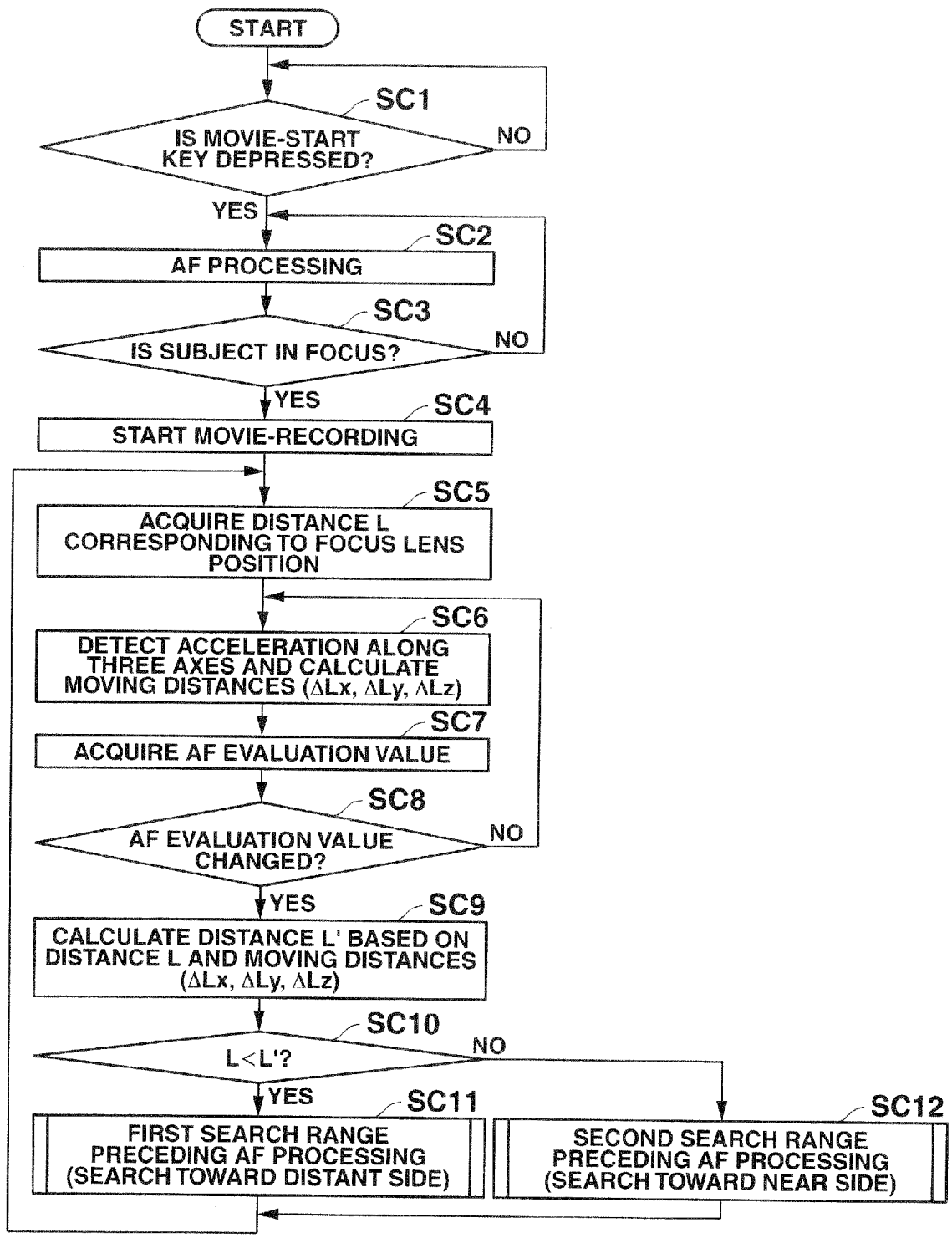
FIG. 8 is a flowchart of operation according to the third embodiment.

Hereinafter, the processing of the CPU 5 will be described with reference to FIG. 8. In the moving image capture mode, the CPU 5 continuously detects whether or not a movie-start key (shutter button) is pressed. When the movie-start key is pressed ("YES" in step SC1), auto focus (AF) processing which employs the common contrast detection is started (step SC2), and the AF processing is continued until a subject comes in focus (while determination result of step SC3 remains "NO"). When the subject finally comes in focus ("YES" in step SC3), movie-recording (capturing, compressing and recording frames of image data at a predetermined frame rate) is started (step SC4). A subject distance L corresponding to the current position of the focus lens is acquired from the FLP-D table 101 (see FIG. 2) and stored in a working memory (step SC5).

Subsequently, the acceleration sensor 17 detects acceleration of the camera main body along the three (x, y, and z) axes, and moving distances ($\Delta Lx$, $\Delta Ly$, $\Delta Lz$) of the camera main body along the axes are calculated based on the detection result (step SC6). Then, AF evaluation values are acquired from each frame of the image signal (or acquired at predetermined frame intervals) (step SC7). Subsequently, when there is no change in the acquired AF evaluation values (while determination result of step SC8 remains "NO"), the processing of steps SC6 and SC7 is repeated. While repeating the processing of steps SC6 and SC7, the position of the focus lens is maintained at a position set under the control of the AF processing in step SC2. That is, focus is locked and the lock is maintained.

Here, the moving distances ($\Delta Lx$, $\Delta Ly$, $\Delta Lz$) calculated in step SC6 represent distances (moving distances in left or right direction, upward or downward direction, and forward or backward direction) between a present position of the camera main body and a lock position at which the camera main body is positioned when focusing with the AF processing is completed in step SC2 (or AF processing in step SC11 or SC12 described later). When executing the processing of step SC6 for the second time or later, moving distances are calculated in such a manner that currently detected moving distances are added to or subtracted from the previously calculated moving distances. The calculated moving distances ($\Delta Lx$, $\Delta Ly$, $\Delta Lz$) are sequentially stored in the working memory.

In step SC8, a peak of the AF evaluation value acquired in the AF processing of step SC2 (or, AF processing of step SC11 or SC12 described later) is stored in the working memory, and the stored peak AF evaluation value is compared with an AF evaluation value acquired in step C7 to determine whether or not there is a difference between the AF evaluation values. When the difference between the AF evaluation value stored in the working memory and the AF evaluation value acquired in step SC7 is within a predetermined allowance range, the determination result is such that "there is no change." When the difference is out of the allowance range, the determination result is such that "there is a change."

Afterward, when the AF evaluation value changes during the movie-recording ("YES" in step SC8), firstly, an appropriate subject distance L' is calculated based on the subject distance L and the moving distances ($\Delta Lx$, $\Delta Ly$, $\Delta Lz$) along the three axes, or final moving distances from the end of the AF processing of step SC2 (or, step SC11 or SC12) (step SC9). Thereafter, it is determined whether or not the calculated appropriate subject distance L' is larger than the subject distance L stored in the working memory (step SC10).

When the determination result of step SC10 is "YES" and it can be determined that the camera main body is moved away from the subject as compared with start of the movie-recording, the first search range preceding AF processing, which is described in the second embodiment with reference to FIG. 7, is performed (step SC11). When the determination result of step 10 is "NO" and it can be considered that the camera main body has approached to the subject as compared with start of the movie-recording, the second search range preceding AF processing, which is described in the second embodiment, is performed (step SC12).

When the first or second search range preceding AF processing is completed, the flow returns to step SC5 to retrieve a subject distance L corresponding to a new focal position, which is set under the control of first or second search range preceding AF processing, from the FLP-D table 101 (see FIG. 2), and then the retrieved subject distance L is stored in the working memory. Afterward, the processing is repeated from step SC6.

As described above, in the present embodiment, even when the subject, which has been brought in focus by the AF processing at the start of the movie-recording or the AF processing performed thereafter, comes out of the focus owing to the movement of the camera main body during the recording, focus deviation is detected based on the change of the AF evaluation value. In response, the position of the focus lens is controlled with the first or second search range preceding AF processing. That is, the focus is automatically corrected.

The subject distance L is corresponding to a position of the focus lens at the start of the recording, and the appropriate subject distance L' is calculated from the moving distances along the three axes detected successively after the start of the movie-recording. In the first and second search range preceding AF processing, the search range for a focal position is preferentially set to a distant or near zone based on the subject distance L and the appropriate subject distance L'. Consequently, the AF processing (focus correction) can be performed at a high speed.

Therefore, even when the focus is brought out of focus during the movie-recording, deviation from the focus can immediately be corrected without manual operation.

In the present embodiment, the above-mentioned appropriate subject distance L' is calculated in response to the change of the AF evaluation value during the movie-recording. However, the appropriate subject distance L' may successively be calculated during the movie-recording regardless of change of the AF evaluation value. That is, the above processing of step SC9 may be performed immediately after step SC6. In this case, only the calculation of the appropriate subject distance L' may periodically be performed with a period different from the frame rate.

The moving distances ($\Delta Lx$, $\Delta Ly$, $\Delta Lz$) of the camera main body to be calculated in step SC6 are not limited to the above-described moving distances, which are distances from a position at which the camera main body is located when the most recent execution of the AF processing is completed. The moving distances may be distances from a position at which the camera main body is positioned at the start of the movie-recording, and the first or second search range preceding AF processing may be performed based on comparison result between a subject distance L which is acquired at the start of the movie-recording and the above-described appropriate subject distance L'.

The first or second search range preceding AF processing is performed only when the AF evaluation value changes; however, the above AF processing may be executed at predetermined time intervals, for example, the AF processing may be executed for each frame.

Moreover, such configuration is possible that an acquired AF evaluation value is stored in the working memory in step SC7 and, in step SC8, compared with an AF evaluation value acquired by the previous execution of step SC7, and then, when there is a change between the AF evaluation values, the first or second search range preceding AF processing is performed. In this case, presence of a change between the previously acquired AF evaluation value and the presently acquired AF evaluation value may be precisely detected.

In the present embodiment, the AF processing is performed so that a search range to be preferentially searched for a focal position is set to a distant or near zone in accordance with result of comparison between a subject distance L and an appropriate subject distance L'. However, as described in the second embodiment, instead of the AF processing to be performed depending on the comparison result between the subject distances L and L', AF processing in which a search range of the focus lens is limited to a distant zone or a near zone may be performed. That is, in a case where the appropriate subject distance L' is larger than the subject distance L which is acquired with the most recent execution of the AF processing, search range of the focus lens may be limited to a distant zone or a near zone. In a case where the appropriate subject distance L' is equal to or smaller than the subject distance L, the AF processing may be performed so that the search range of the focus lens is limited to the near zone.

In the first to third embodiments, the digital camera 1 which is not provided with an optical zoom function has been described; however, the present invention is applicable to a digital camera having the optical zoom function. It should be noted that when an optical system for image capture includes such configuration that relation between a subject distance and a position of the focus lens changes depending on a change in magnification of optical zoom, used is a FLP-D table having data constitution representing relation between a subject distance and a position of the focus lens for each optical zoom magnification, unlike the FLP-D table shown in FIG. 2.

Moreover, in any case, the FLP-D table 101 is not necessarily be used, and a position of the focus lens corresponding to an appropriate subject distance L' may be acquired by calculation.

Description given herein is about a case in which the present invention is applied to a digital camera having common configuration. However, the application is not limited to such digital camera. The present invention may be applied to another camera apparatus, which has an auto focus function, such as a digital video camera and a digital camera embedded in information apparatus such as a cellular phone terminal.

What is claimed is:

1. A camera apparatus comprising:
   a focus lens;
   an auto focus controller configured to control the focus lens to move to a focal position;
   a moving distance acquiring unit configured to acquire a moving distance of a main body of the camera apparatus after the focus lens is moved to the focal position by the auto focus controller;
   a focus correction unit configured to correct a position of the focus lens based on the moving distance acquired by the moving distance acquiring unit;
   a subject distance acquiring unit configured to acquire a subject distance when the focus lens is moved to the focal position by the auto focus controller;
   a distance storage unit configured to store the subject distance acquired by the subject distance acquiring unit; and
   a distance calculator configured to calculate an appropriate subject distance based on the subject distance stored in the distance storage unit and the moving distance acquired by the moving distance acquiring unit,
   wherein the focus correction unit corrects the position of the focus lens based on the appropriate subject distance calculated by the distance calculator.

2. The camera apparatus according to claim 1, wherein the auto focus controller controls the focus lens to move to the focal position in response to a first operation.

3. The camera apparatus according to claim 2, further comprising a shutter button capable of being half depressed and full depressed, wherein the first operation includes half depression of the shutter button.

4. The camera apparatus according to claim 1, wherein the focus correction unit corrects the position of the focus lens in response to a second operation.

5. The camera apparatus according to claim 4, wherein the moving distance acquiring unit acquires the moving distance of the main body until the second operation is performed.

6. The camera apparatus according to claim 4, further comprising an image capture instructing unit configured to instruct image capture, wherein the second operation includes image capture instruction performed with the image capture instructing unit.

7. The camera apparatus according to claim 6, wherein the image capture instructing unit includes a shutter button capable of being half depressed and full depressed, and wherein the second operation includes full depression of the shutter button.

8. The camera apparatus according to claim 6, further comprising an image capture controller configured to execute image capture processing after the focus correction unit corrects the position of the focus lens.

9. The camera apparatus according to claim 1, further comprising a motion detector configured to detect motion information representing motion of the main body, wherein the moving distance acquiring unit acquires the moving distance of the main body based on the motion information detected by the motion detector.

10. The camera apparatus according to claim 9, wherein the motion detector includes an acceleration sensor and the moving distance acquiring unit acquires the moving distance of the main body based on an acceleration detected by the acceleration sensor.

11. The camera apparatus according to claim 10, wherein the acceleration sensor detects the acceleration along three axes and the moving distance acquiring unit acquires moving distances of the main body along the three axes based on the acceleration along the three axes detected by the acceleration sensor.

12. The camera apparatus according to claim 1, wherein the moving distance acquiring unit acquires moving distances of the main body along three axes.

13. The camera apparatus according to claim 1, further comprising a focal position acquiring unit configured to acquire a lens position at which the focus lens focuses on a subject which is positioned at the appropriate subject distance, wherein the focus correction unit controls the focus lens to move to the lens position acquired by the focal position acquiring unit.

14. The camera apparatus according to claim 13, further comprising a table information storage unit configured to store table information representing relationships between lens positions of the focus lens and corresponding known subject distances;

wherein, when the focus lens is positioned at one of the lens positions, the focus lens focuses on the subject which is positioned at the corresponding subject distance; and wherein the focus position acquiring unit acquires the lens position according to the appropriate subject distance from the table information stored in the table information storage unit.

15. The camera apparatus according to claim 1, further comprising:

an image capture unit configured to capture an image of the subject; and a search range determination unit configured to perform a comparison between the subject distance stored in the distance storage unit and the appropriate subject distance calculated by the distance calculator, and to determine a first search range of the focus lens based on a result of the comparison, wherein the focus correction unit searches, with the focus lens being moved, the first search range determined by the search range determination unit for the focal position at which an contrast value of the image of the subject captured by the image capture unit becomes maximum.

16. The camera apparatus according to claim 15, wherein the focus correction unit searches, with the focused lens being moved, a second search range different from the first search range for the focal position at which a contrast value of the image of the subject becomes maximum.

17. The camera apparatus according to claim 1, wherein the auto focus controller controls the focus lens to move to the focal position in response to focus lock operation which precedes an instruction to capture a still image, and wherein the focus correction unit corrects the position of the focus lens in response to the instruction to capture a still image.

18. The camera apparatus according to claim 1, wherein the auto focus controller controls the focus lens to move to the focal position in response to an instruction to record a moving image, and the focus correction unit corrects the position of the focus lens each time a predetermined condition is satisfied during recording the moving image.

19. The camera apparatus according to claim 18, further comprising:

an image capture unit configured to capture an image of the subject;

a contrast value acquiring unit configured to sequentially acquire contrast values from frames of the image captured by the image capture unit during recording the moving image; and a change detection unit configured to detect a change in the contrast values sequentially acquired by the contrast value acquiring unit, wherein the focus correction unit corrects the position of the focus lens each time the change detection unit detects the change in the contrast values.

20. An auto focus control method for use with a camera apparatus comprising a focus lens, the method comprising:

controlling the focus lens to move to a focal position;

acquiring a moving distance of a main body of the camera apparatus after the focus lens is moved to the focal position;

acquiring a subject distance when the focus lens is moved to the focal position;

storing the acquired subject distance;

calculating an appropriate subject distance based on the stored subject distance and the acquired moving distance; and correcting a position of the focus lens based on the calculated appropriate subject distance.

21. A non-transitory computer readable storage medium having a program stored thereon for controlling a computer system which is included in a camera apparatus comprising a focus lens to perform functions comprising:

controlling a focus lens of a camera apparatus to move to a focal position;

acquiring a moving distance of a main body of the camera apparatus after the focus lens is moved to the focal position;

acquiring a subject distance when the focus lens is moved to the focal position;

storing the acquired subject distance;

calculating an appropriate subject distance based on the stored subject distance and the acquired moving distance; and correcting a position of the focus lens based on the calculated appropriate subject distance.

* * * * *